Oct. 27, 1942.  J. T. DALTON  2,300,347
TRIGONOMETRICAL CALCULATING DEVICE
Filed Dec. 29, 1941    3 Sheets-Sheet 1
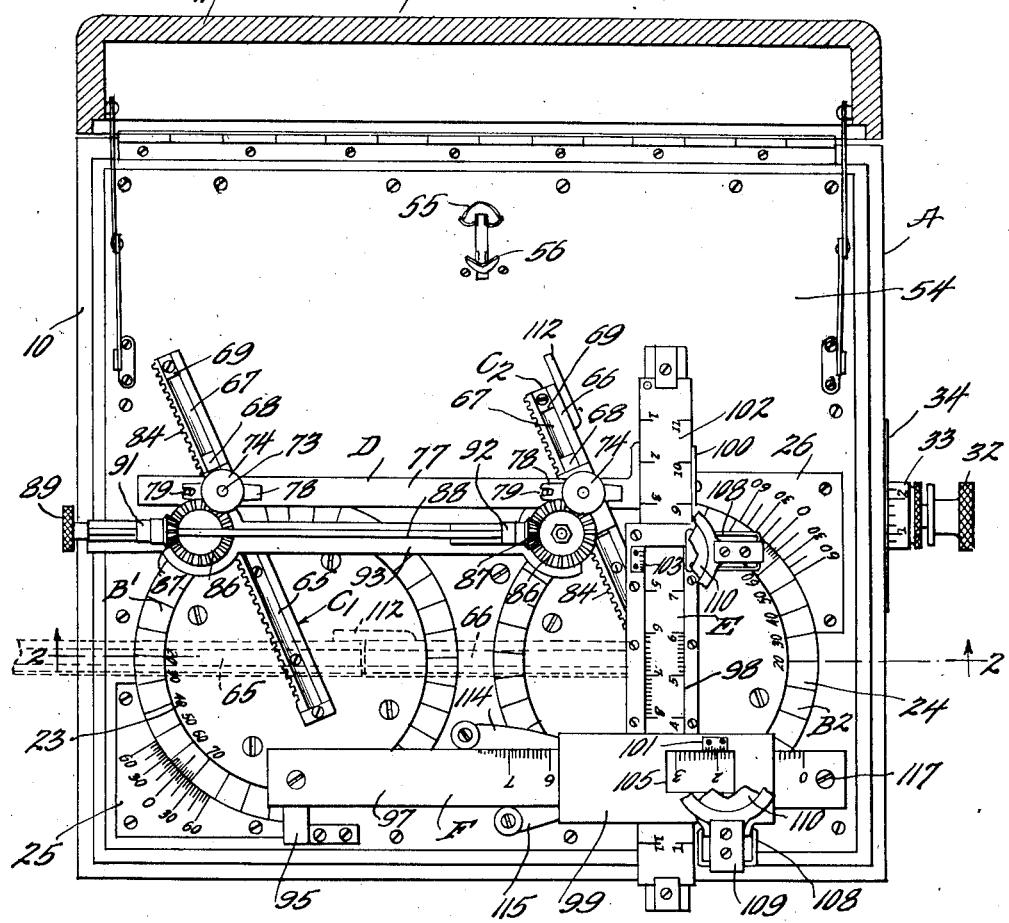
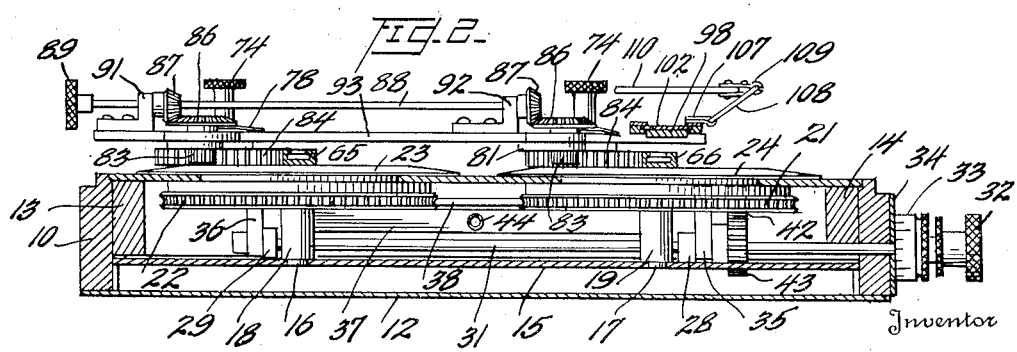
Inventor
John T. Dalton
By Norris & Bateman
Attorneys Oct. 27, 1942.  J. T. DALTON  2,300,347
TRIGONOMETRICAL CALCULATING DEVICE
Filed Dec. 29, 1941   3 Sheets-Sheet 2
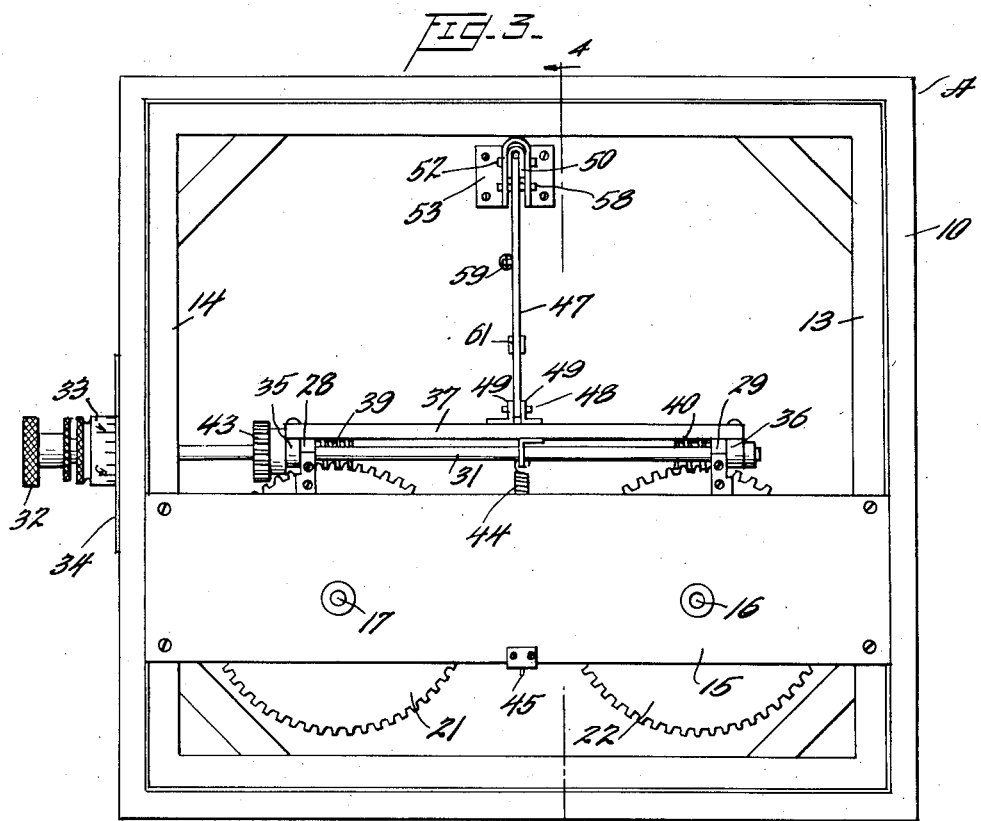
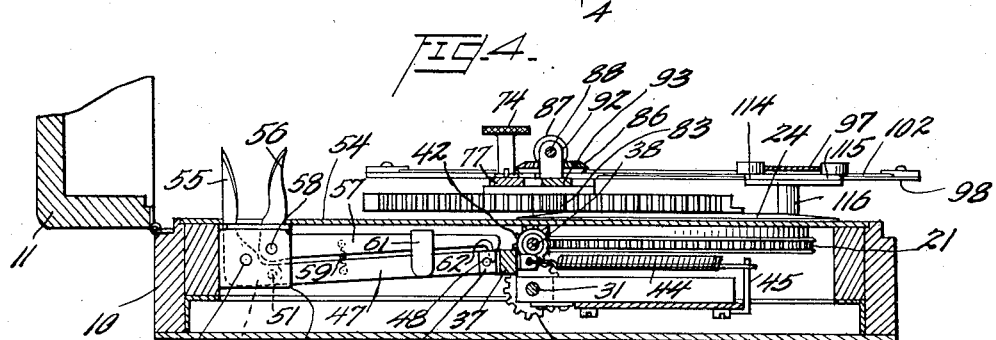
Inventor
John T. Dalton
By Norris & Bateman
Attorneys Oct. 27, 1942.                J. T. DALTON                2,300,347
                  TRIGONOMETRICAL CALCULATING DEVICE
                      Filed Dec. 29, 1941           3 Sheets-Sheet 3
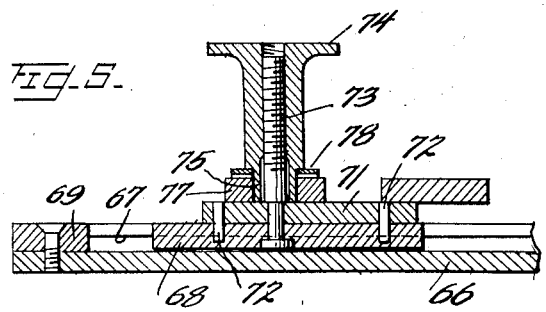
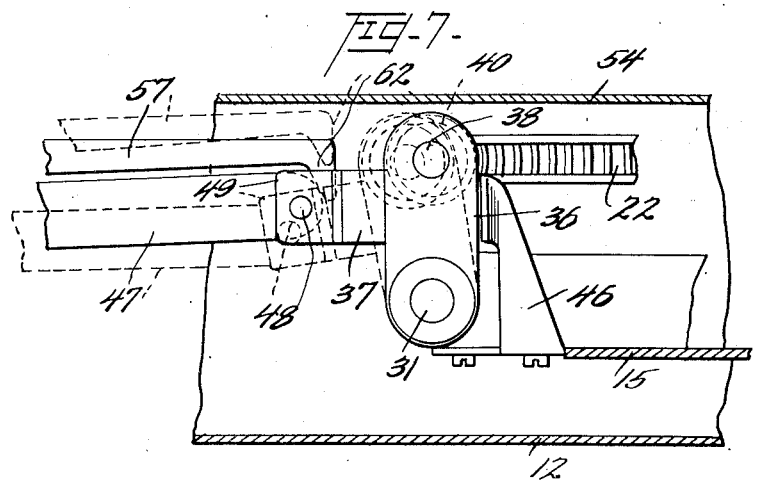
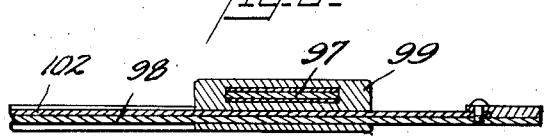
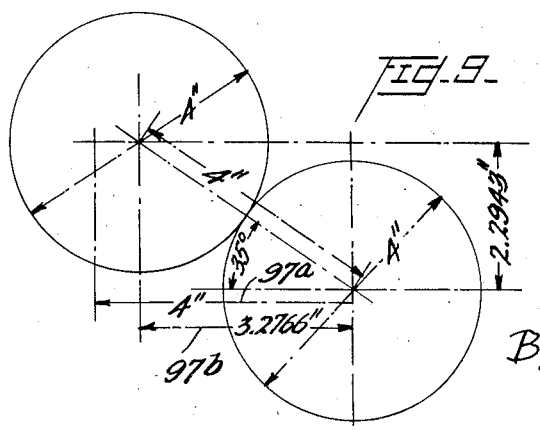
Inventor
John T. Dalton,
By
Attorneys Patented Oct. 27, 1942

2,300,347

UNITED STATES PATENT OFFICE 2,300,347

TRIGONOMETRICAL CALCULATING DEVICE

John T. Dalton, Durham, N. C.

Application December 29, 1941, Serial No. 424,821

19 Claims. (Cl. 33—98)

The present invention relates to trigonometrical calculating devices, and is particularly concerned with devices for directly indicating the horizontal and vertical components of the motion of a point traveling in a circular path, although it is not limited to such use.

Apparatus of this general character have been heretofore proposed, but they have not proved altogether satisfactory because they have either been of complicated costly construction or have been so constructed as to give only approximately accurate measurements, with the result that they found use in only limited applications, and could not be used for precision work, as, for instance, laying out gear centers or the like.

It is the major object of this invention to provide a novel calculating device which is readily adjustable to various diameters; embodies mechanism for effecting a rapid movement of the parts through the desired angle to the approximate angular position, and a slow movement to final position; embodies scales which are freely slidable without binding during swinging of the parts through the angle under consideration and yet which yield an accurate measurement of the components of rectilinear movement.

Another important object is to provide a device embodying a pair of arms and two mechanisms for maintaining them in accurate synchronism during swinging thereof; and to so design the parts that one mechanism may be rendered temporarily inactive to permit free swinging of the arms through a large angle.

A further object is to provide a pair of arms joined by a bar for synchronous swinging movement and having means for quickly adjusting the pivotal points of the bar outwardly or inwardly on said arms, and for locking the bar in any desired adjusted position on the arms.

Another object is to provide improved means for swinging the arms through, and determining accurately the desired angle.

Further objects will become apparent as the specification proceeds in conjunction with the annexed drawings, and from the appended claims.

In the drawings,

Figure 1 is a top plan view of a device embodying the invention, illustrating the parts swung through an angle of approximately sixty degrees;

Figure 2 is a vertical sectional view taken substantially on the line 2—2 of Figure 1, looking in the direction of the arrows;

Figure 3 is a bottom plan view of the device shown in Figure 1;

Figure 4 is a vertical sectional view taken substantially on the line 4—4 of Figure 3;

Figure 5 is a fragmental sectional view on an enlarged scale, showing the manner in which the slide block assemblies are mounted on the arms;

Figure 6 is a fragmental top plan view on an enlarged scale, showing the construction of the mechanism for moving the bar in and out for different diameters on the arms;

Figure 7 is an enlarged detail view, showing the manner in which the worms are brought into and out of mesh with the worm gears;

Figure 8 is an enlarged detail view of the scales and the crossed guide member supported on the stationary scale; and, Figure 9 is a diagrammatic view, illustrating the manner in which the device is used to lay out the centers for gears.

With continued reference to the drawings, wherein like reference characters have been employed to designate like parts throughout the several views thereof, the device is contained in a carrying case A, and broadly comprises a pair of rotatable dials $B_1$ and $B_2$ carrying arms $C_1$ and $C_2$, respectively. The arms are pivotally connected to a bar D, which swings in an arc with arms $C_1$ and $C_2$, and indicates directly on a scale E the vertical component of the circular path defined by the pivot points of the bar, and on a scale F the horizontal component.

The case comprises a body 10 having a hinged cover 11 and is provided with a bottom wall 12. Supported on a pair of blocks 13 and 14 on the interior of the casing is a metal plate 15, which carries as a unit substantially all of the parts of the device, as will be hereinafter described.

The novel swinging mechanism of the invention is mounted on a pair of stub shafts 16 and 17 rigidly secured in base plate 15. Freely rotatable on shafts 16 and 17 are the shaft or hub portions 18 and 19 of a pair of identical worm gears 21 and 22, carrying dials 23 and 24. The dials are provided with indicia denoting degrees of rotation of the dials, and coact with indicia bearing plates 25 and 26 supported in the case on blocks 13 and 14, respectively. The dials support the novel arm assemblies, to be hereinafter described. The novel driving mechanism for the dials, which may be disengaged at will to permit free rotation of the dials, will now be described.

Referring to Figures 2, 3 and 4, journalled in a pair of brackets 28 and 29 carried by plate 15 is a drive shaft 31 projecting through a side wall of the case and having any suitable rotating means secured thereto, as, for instance, a knurled knob 32. The actuating knob is provided with a portion 33 divided into five major divisions, and any suitable number of sub-divisions, cooperating with a reading line on a plate 34 secured to the side of the case. The ratio of the gearing to now be described is such that when shaft 31 is rotated through an angular distance equal to one major division of knob 33, the dials will be rotated one degree, and a full revolution will rotate the dials through five degrees.

Rockably mounted on shaft 31 are a pair of links 35 and 36 which are rigidly interconnected by a bar 37 to provide a stable frame, and in which is journalled a shaft 38 carrying a pair of worms 39 and 40 normally meshing with worm gears 21 and 22. Shaft 38 also carries a spur gear 42 which constantly meshes with a spur gear 43, of slightly larger diameter, mounted on shaft 31. By rocking the frame counterclockwise (as viewed in Figures 4 and 7) the worms may be disengaged from the worm gears, so as to permit free rotation of the dials, without disengaging gears 42 and 43. The frame is constantly urged toward engaging position by a tension spring 44 anchored to a pin 45 on plate 15.

Movement of the frame toward engaged position is limited by a pair of abutments 46 provided on brackets 28 and 29, and cooperating with links 35 and 36 to limit the depth of engagement of the worms with the worm gears, as seen more clearly in Figure 7.

By means of a remote-control actuating mechanism, the worms may be swung toward or away from operative position by one hand of the operator, while his other hand is free to rotate the dials or arms into the approximate angular position desired. The mechanism is shown more clearly in Figures 3, 4 and 7, and comprises a link 47 pivotally connected to frame member 37 by a pin 48 and angle pieces 49. The other end of link 47 is connected to a bifurcated bell-crank lever 50 by a pin 51, and the lever is journalled in a pin 52 in a bracket 53 secured to the under side of a face plate 54. Lever 50 is provided with a finger piece 55 at its upper end disposed in cooperative relationship to the finger piece 56 of a bell crank lever 57 pivoted in bracket 53 on a pin 58. Lever 57 is urged toward lever 47 by a tension spring 59, and is guided for vertical movement by means of a slotted guide 61 fitting over lever 47. Lever 57 is also provided with a nose or latch portion 62 which fits between pin 48 and the rear face of frame member 37, so that in the position of the parts shown in Figures 4 and 7, the frame is restrained against movement away from the worm gears by the nose of lever 57, and is restrained against rocking too far into mesh with the worm gears by stops 46.

Taking up the operation of the structure thus far described, assuming that the parts are in the positions shown in Figure 4, and the full line position in Figure 7, and the operator desires to rock the dials through a large angle, finger pieces 55 and 56 are grasped by one hand and lever 57 rocked counterclockwise and lever 50 then rocked clockwise. This results in the nose 62 of lever 57 being swung upwardly out of the path of member 37, into the dotted line position of Figure 7. Link 47 then swings member 37 counterclockwise into the dotted line position of Figure 7, thereby bringing the worms out of mesh with the worm gears 21 and 22, and freeing the dials for rotation.

While holding the worms out of mesh with one hand, as just described, the operator rotates the dials into approximately the desired position and then releases finger pieces 55 and 56, whereupon spring 44 returns the frame to operative position, and spring 59 snaps lever 57 down, so as to bring its nose behind member 37, thereby locking the parts in their original positions. Knob 32 is then rotated in the proper direction to bring the dials into the final desired position, and since the calibrated movement of knob 32 is reflected as a very small movement of the dials, by reason of the worm gear reduction, the adjustment may be carried out with extreme accuracy.

The novel calculating mechanism actuated by the dials will now be described, it being remembered that the dials are rotated in exact synchronism by the worm gear mechanism, and that they are normally rotated through a major working angle of ninety degrees, which is sufficient to measure the sines and cosines of any desired angle met with in practice, and the results may be computed to give the required offsets for larger angles.

Referring particularly to Figures 1, 2, 5 and 6, rigidly secured to dials 23 and 24, by screws or the like, in accurately disposed relationship to their dial markings, are arms 65 and 66, respectively. Since the arms are of similar construction and carry similar slide assemblies, only one of them will be described in detail, and similar reference characters have been applied to each.

Referring to Figure 5, arm 66 is provided with a dovetail or undercut longitudinal guideway 67, in which a block 68 is mounted, a stop 69 at the end of the guideway limiting the outward movement. Block 68 terminates slightly short of being flush with the top surface of the arm, and a clamp member 71 is secured thereto by means of pins 72, which have a sufficiently loose fit in block 68 to permit movement of the blocks toward and away from each other. The blocks are adapted to be clamped in any desired adjusted position in the guideway by means of a screw 73, rigidly secured to block 68 and having a knurled nut 74 threaded thereon. A reduced portion 75 on the nut engages the top of block 71, forcing it into tight engagement with the top of arm 66, while screw 73 pulls block 68 into tight engagement with the underside or rib of the undercut guideway.

Pivoted for free rocking movement on each reduced portion 75 of nuts 74 is a bar 77, which is resiliently held in engagement with the upper sides of blocks 71 by means of a leaf spring 78. The latter fits over the reduced portion of the nut and is prevented from rocking out of the proper plane by a pin 79. The free end of bar 77 is adapted to actuate the indicating mechanism, as will hereinafter appear.

The slide assemblies are adapted to be simultaneously moved in or out on the arms, to decrease or increase the working diameter of device, by a novel gear assembly that will now be described. Each block 71, as seen in Figure 6, is provided with a laterally offset portion 81 in which is journalled a shaft 82 carrying a pinion 83 meshing with rack teeth 84 on arm 66.

Pinions 83 are synchronously rotated by means of bevel gears 86 secured to shafts 82 and meshing with bevel pinions 87 carried by a shaft 88 having a knurled knob 89 for rotating it. Shaft 88 is journalled in brackets 91 and 92 secured to a bar 93 disposed parallel to bar 77. Bar 93 is supported by offset portions 81 of slide blocks 71, and is maintained in proper relationship by having journal portions 94 through which shafts 82 extend. Bar 93, accordingly, also ties arms 65 and 66 together, and is disposed parallel with bar 77, coacting therewith to form a parallel motion mechanism for insuring synchronous angular movement of the dials when they are being rocked independently of the worm gear mechanism.

Bar 77, accordingly, will accurately follow rocking movement of arms 65 and 66, and by loosening nuts 74 and rotating knob 89 in the proper direction, the bar may be moved in or out on the arms, to decrease the effective diameter through which the bar is swung. The bar is connected to a novel mechanism for directly indicating the components of rectilinear motion making up the arcuate movement of the bar, which will now be described.

Rigidly supported in the casing, by means of a bracket 95, and a support 116, is a stationary scale 97, graduated in any desired manner, as, for instance, in inches and tenths, and it may be termed the cosine scale, as it measures distances across. Mounted for longitudinal sliding movement on scale 97, and having a guideway 98 disposed exactly at ninety degrees thereto, is a cross head 99, having a vernier scale plate 101 coacting with the scale thereof. Slidable in guideway 98, and rigidly secured to the head 100 of bar 77 is a scale plate 102, having indicia coacting with a vernier scale plate 103 carried by the guideway. Arms 65 and 66 and bar 77 are located below guideway 98 and scale plate 102, so that they may swing thereunder without interference.

From the foregoing, it is apparent that when arms 65 and 66 are rotated clockwise, as viewed in Figure 1, bar 77 moves scale plate 102 upwardly in guide 98, and at the same time causes cross head 99 to move to the right, the position being accurately determined by means of a vernier scale 101 mounted on the cross head to one side of an opening 105 in cross head 99, through which the indicia on member 97 may be viewed.

To increase the accuracy with which readings of the scales may be made, I preferably provide both cross head 99 and guide 98 with novel magnifying glass assemblies, each of which comprises a clip 107, which is fastened to the cross head and guide, a wire link 108 pivoted in clip 107 with sufficient friction to hold it in adjusted position. Pivoted on the upper end of each link 108 is a second clip 109 carrying a magnifying glass 110, and the clip grips the link with sufficient friction to hold the glass in adjusted position. Accordingly, by grasping the glass and rocking link 108, the glass may be moved toward or away from the scale to establish the correct focus, and by reason of the friction in the joints, the glass will be automatically maintained in any adjusted position.

Taking up the operation of the device, and assuming that it is desired to determine the centers for two four-inch pitch diameter gears, with one gear dropped down thirty-five degrees, with the parts disposed in the position shown in Figure 1, the procedure is as follows:

Finger pieces 55 and 56 are actuated to release the worms from the worm gears, as previously described. The operator, with his other hand, grasps either knob 74 and pulls the assembly toward him, so as to swing arms 65 and 66 counterclockwise until a stop 112 on the end of arm 66 contacts the side of arm 65 opposite its rack. This accurately arrests the parts in zero or starting condition.

With the parts in the condition just described, the vernier on guide 98 registers with the "zero" of scale 102 and the device is ready for operation. Nuts 74 are now loosened and knob 89 is rotated to bring the four-inch diameter marking on scale 97 into exact alignment with the vernier scale 101 on cross head 99. Nuts 74 are then tightened. Finger pieces 55 and 56 are then operated to release the worms and one of the nuts 74 is grasped and the assembly rocked clockwise through an angle of substantially thirty-five degrees, as indicated by scale 25 or 26. Finger pieces 55 and 56 are then released, so as to allow spring 44 to reengage the worms with the worm gears. Now, by rotating knob 32 in the proper direction, and observing the position of the markings of scale 33 with respect to the reading line on plate 34, the parts may be brought exactly into the thirty-five degree position.

While the parts are being moved, as just described, scale 102 moves outwardly in guide 98 and at the same time moves cross head 99 to the right in Figure 1. This sets up a canting action and in order to prevent the cross head from binding on stationary scales 97, I preferably provide the cross head with a pair of arms 114 and 115 carrying rollers at their outer ends engaging the sides of scale 97 and cooperating to prevent binding in either direction of actuation of the swinging arm and bar assembly. Arm 115 is slightly shorter than arm 114, so as to clear bracket 95 in the zero position of the device. The other end of scale 97 is secured to a post 116 by means of a screw 117, and is out of the path of swinging movement of the parts.

With the arms 65 and 66 swung through an angle of thirty-five degrees, as just described, scales 97 and 102 are then read, giving the two components of straight line motion directly in inches or any other desired units of measurement.

The calculating operation just described is diagrammatically shown in Figure 9, the four-inch dimensions between the centers being indicated 97a, the horizontal offset 3.2766 inches (read on scale 97) designated 97b, and the vertical offset 2.2943 inches (read on scale 102) designated 102a.

Since any gear layout problems can be reduced to the calculation of offsets within an angle of ninety degrees, it is apparent that the device of the invention can be used to solve any such problem.

The device is also useful in performing many other calculations. For instance, if it be desired to find the pitch diameter of an eighteen tooth one-half inch pitch roller chain type sprocket, the machine would be set to zero, and scale 97 set to zero, and the arms rotated ten degrees, since this is one-half of the twenty degrees to each tooth of the sprocket. Nuts 74 are then loosened and knob 89 rotated to move scale 102 outwardly. As soon as the scale reaches the $500/1000$ inch point, nuts 74 are tightened and the dials rotated back to zero. The required pitch diameter is then read directly on scale 97.

For a ⅝ inch pitch sprocket, the procedure is the same as before, except that the scale is moved out to the $625/1000$ inch point.

For a ¾ inch pitch eighteen tooth sprocket, the machine is set to zero to start with, and then rotated ten degrees, nuts 74 are loosened and scale 102 moved out until the $725/1000$ inch point is reached. The nuts are then tightened and the scales rotated back to zero, and the pitch diameter read on scale 97, as before.

I claim as my invention:

1. In a trigonometrical calculating device, a supporting structure, a pair of members mounted for rotation about spaced parallel axes on said structure, a radially directed arm carried by each member, means for synchronously rocking said members and arms through equal angular displacements, comprising a shaft and gear means for causing a predetermined angular displacement thereof to be reflected as proportional angular displacements of said members, and means associated with said arms for indicating the sine and cosine of the angle through which the latter are rocked.

2. The device defined in claim 1, wherein said gear means is self-locking and prevents rocking efforts applied to said arms from being reflected as rocking movement of any of said members or shaft.

3. The device defined in claim 1, wherein said gear means comprises a pair of worms on said shaft meshing with a worm gear on each of said members.

4. In a trigonometric calculating device, a support, a pair of members mounted for rotation about parallel axes on said support, a radially directed arm carried by each member, a drive shaft rotatable on said support, irreversible gear means for causing said drive shaft to rotate said pair of members in unison, means for rendering said gear means inoperative at will, for allowing for rotation of said pair of members independently of said drive shaft, and means for indicating the vertical and horizontal components of the circular motion of any point on said arms.

5. The device defined in claim 4, together with means for maintaining said arms in parallel relationship when said gear means is rendered inoperative.

6. The device defined in claim 4, wherein said gear means comprises a gear on said drive shaft meshing with a drive gear carried on a countershaft rotatably mounted in a frame rockable about the axis of said drive shaft and having worms movable into and out of mesh with worm gears carried by said pair of members.

7. In a trigonometric calculating device, a support, a pair of indicator shafts mounted for rotation about parallel axes on said support and each rigidly carrying a worm gear, a drive shaft mounted for rotation on said support and carrying a drive gear, a structure mounted on said support, a driven shaft mounted for rotation on said structure about an axis parallel to said drive shaft and rigidly carrying a driven gear meshing with said drive gear, a pair of worms on said driven shaft and meshing with the worms on said indicator shafts, said gears being so proportioned to cause a full rotation of said drive shaft to be reflected as an angular displacement of each of said indicator shafts of a predetermined number of degrees, and means associated with said indicator shafts for indicating the sine and cosine of the angle through which said indicator shafts are displaced.

8. The device defined in claim 7, wherein said drive gear is of larger diameter than said driven gear and is operable to displace said indicator shafts five degrees for each full rotation of said drive shaft.

9. The device defined in claim 7, wherein said structure is mounted for limited rocking movement about the axis of said drive shaft, for disengaging said worms from said worm gears at will.

10. The device defined in claim 7, wherein said structure is rockable to bring said worms into and out of mesh with said worm gears, and stop means are provided for limiting the depth of meshing engagement.

11. In a trigonometric calculating device, a pair of indicator members mounted for rotation about parallel axes and each carrying a worm gear, a frame structure rockable toward and away from said members and rotatably supporting a shaft carrying worms, adapted in one position of said frame structure to mesh with said worm gears and in another position to be disengaged from said worm gears, resilient means urging said frame toward worm engaging position, and latch means for releasably locking said frame in worm engaging position.

12. The device defined in claim 11, together with a remote control means for moving said frame toward worm disengaging position, located in close proximity to a remote control actuating means for said latch means and adapted to be operated by one hand of an operator.

13. In a trigonometric calculating device, a pair of arms mounted for rocking movement about parallel axes and having outwardly extending guideways, a pivot member slidably mounted on each of said guideways, a bar pivotally interconnecting said pivot members for effecting synchronous rocking movement of said arms, adjusting means for simultaneously moving said pivot members inwardly or outwardly in said guideways by equal amounts, means for locking said pivot members in adjusted position on said arms, and means for indicating the sine and cosine of the angle through which said arms are rocked.

14. The device defined in claim 13, wherein said adjusting means includes a second bar pivotally interconnecting said pivot members and forming with said first bar a parallel motion mechanism.

15. The device defined in claim 13, wherein said adjusting means comprises a pinion meshing with rack teeth on each of said arms, and gear means for rotating said pinions in exact synchronism.

16. The device defined in claim 13, wherein said indicating means comprises a stationary scale member disposed parallel to a plane containing the axes of said shafts; a slider mounted on said scale and having a guideway disposed at right angles thereto; and a second scale member mounted in said guideway and rigidly connected to said bar.

17. In a trigonometric calculating device, a pair of pivoted arms having guideways, a block assembly slidable in each guideway, a threaded element carried by each block assembly for adjustably locking the respective block assembly in its guideway, and a bar pivotally connected to each of said threaded elements.

18. The device defined in claim 17, wherein each block assembly comprises a member disposed below a rib in said guideway and a member disposed above said rib, and said threaded element is connected to said first member and a nut is threaded thereon and engages the top of said member disposed above said rib, for frictionally clamping the latter therebetween and thereby locking the block assembly on said arm.

19. In a trigonometric calculating device, a pair of arms carrying inwardly and outwardly adjustable block assemblies, pivot means on each block assembly, a bar interconnecting the pivot means of said assemblies for effecting substantially simultaneous rocking movement of said arms, said assemblies also each carrying a rotatable shaft, a pinion on each shaft meshing with rack teeth on each arm, a second bar disposed parallel to said first bar and pivotally connected to said shafts, so as to provide a parallel motion linkage, a bevel gear on each shaft, a drive shaft journalled on said bar and extending from one arm to the other, and a pair of bevel gears on said drive shaft and meshing with said first-named bevel gears for effecting synchronous rotation of said first-named shafts and pinions, for effecting equal displacement of said block assemblies inwardly or outwardly on said arms.

JOHN T. DALTON.